United States Patent
Davis et al.

(10) Patent No.: US 9,374,290 B2
(45) Date of Patent: Jun. 21, 2016

(54) SYSTEM AND METHOD FOR PROVIDING TCP PERFORMANCE TESTING

(75) Inventors: Daniel H. Davis, Herndon, VA (US);
Travis J. Chelgren, Ashburn, VA (US);
James P. Koskulitz, Herndon, VA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 1249 days.

(21) Appl. No.: 12/966,061

(22) Filed: Dec. 13, 2010

(65) Prior Publication Data
US 2012/0151038 A1 Jun. 14, 2012

(51) Int. Cl.
| H04L 12/12 | (2006.01) |
| H04L 12/26 | (2006.01) |
| H04L 12/24 | (2006.01) |
| H04L 12/701 | (2013.01) |
| G02B 5/30 | (2006.01) |
| H04N 21/2343 | (2011.01) |

(52) U.S. Cl.
CPC .............. *H04L 43/50* (2013.01); *H04L 12/12* (2013.01); *H04L 12/2697* (2013.01); *H04L 41/0896* (2013.01); *H04L 43/18* (2013.01); *H04L 45/00* (2013.01); *G02B 5/3083* (2013.01); *H04N 21/2343* (2013.01)

(58) Field of Classification Search
None
See application file for complete search history.

(56) References Cited

U.S. PATENT DOCUMENTS

| 6,397,359 B1 * | 5/2002 | Chandra | H04L 12/2697 709/224 |
| 6,681,232 B1 * | 1/2004 | Sistanizadeh | H04L 12/2602 |
| 7,243,148 B2 * | 7/2007 | Keir | G02B 5/3083 709/224 |
| 7,305,464 B2 * | 12/2007 | Phillipi | H04L 12/2697 709/223 |
| 7,599,308 B2 * | 10/2009 | Laver | H04L 12/24 370/252 |
| 7,617,337 B1 * | 11/2009 | Beck | H04L 65/80 370/229 |
| 2003/0081599 A1 * | 5/2003 | Wu | H04L 47/10 370/389 |

(Continued)

OTHER PUBLICATIONS

Balakrishman et al. "A Comparison of Mechanisms for Improving TCP Performance Over Wireless Links" (IEEE/ACM Transactions on Networking, vol. 5, No. 6, Dec. 1997, pp. 756-759).*

(Continued)

*Primary Examiner* — Ranodhi Serrao
*Assistant Examiner* — James Fiorillo

(57) ABSTRACT

A system and method for providing Transmission Control Protocol (TCP) performance testing is disclosed. The system may comprise an input configured to receive configuration information for performance testing of a network element. The system may also comprise an output configured to transmit traffic generation information based on the configuration information to a traffic generator to generate continuous streams of bidirectional TCP traffic to the network element and to output results of performance testing based on analysis of network element response. The system may also comprise a processor configured to analyze network element response to the continuous streams of bidirectional TCP traffic, wherein the results of performance testing are based on analysis of network element response.

21 Claims, 13 Drawing Sheets

(56) References Cited

U.S. PATENT DOCUMENTS

| | | | |
|---|---|---|---|
| 2005/0041592 A1* | 2/2005 | Hannel | H04L 12/2697 370/241 |
| 2005/0213586 A1* | 9/2005 | Cyganski | H04L 41/0896 370/395.41 |
| 2005/0222815 A1* | 10/2005 | Tolly | H04L 12/2697 702/185 |
| 2005/0226251 A1* | 10/2005 | Krzanowski | H04L 12/2856 370/395.41 |
| 2005/0243822 A1* | 11/2005 | Jain | H04L 43/087 370/389 |
| 2006/0068769 A1* | 3/2006 | Adya | H04W 24/08 455/418 |
| 2007/0201371 A1* | 8/2007 | Chou | H04L 45/12 370/237 |
| 2008/0037420 A1* | 2/2008 | Tang | H04L 1/1607 370/229 |
| 2008/0115185 A1* | 5/2008 | Qiu | H04N 21/2343 725/118 |
| 2009/0034423 A1* | 2/2009 | Coon | H04L 69/163 370/244 |
| 2010/0008248 A1* | 1/2010 | Constantine | H04L 43/50 370/252 |
| 2011/0016223 A1* | 1/2011 | Iannaccone | H04L 45/00 709/232 |
| 2011/0085451 A1* | 4/2011 | Takahara | H04L 12/2697 370/249 |
| 2012/0120801 A1* | 5/2012 | Ramakrishnan | H04L 43/0894 370/235 |

OTHER PUBLICATIONS

Breslau et al. "Advances in Network Simulation" (IEEE Computer, May 2000, pp. 59-67).*

Vishmanath et al.".Routers With Very Small Buffers: Anomalous Loss Performance for Mixed Real-Time and TCP Traffic" (Quality of Service, IWQos, Jun. 2-4, 2008, 16th International Workshop, pp. 80-89).*

Postel, "RFC 879—The TCP Maximum Segment Size and Related Topics," Nov. 1983, 11 pages.*

* cited by examiner

SYSTEM AND METHOD FOR PROVIDING TCP PERFORMANCE TESTING

BACKGROUND INFORMATION

Performance testing in computing environments typically involves various network elements, such as routers or switches. Because network elements play an important role in telecommunications systems and how managed network service features are delivered, one goal of such performance testing is to determine how a particular network element performs under a specified workload. In general, performance testing may serve to validate or verify additional quality attributes, such as scalability, reliability, throughput capacity, resource usage, etc. However, traditional performance testing methodologies are generally directed to User Datagram Protocol (UDP) under Request for Comment (RFC) guidelines. However, UDP performance testing is limited and does not account for multiple types of traffic that a network element experiences, such as Transmission Control Protocol (TCP). Current performance testing technologies and methodologies do not provide a comprehensive and efficient way to provide TCP performance testing.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF EMBODIMENTS

Reference will now be made in detail to exemplary embodiments, examples of which are illustrated in the accompanying drawings. It should be appreciated that the same reference numbers will be used throughout the drawings to refer to the same or like parts. It should be appreciated that the following detailed description are exemplary and explanatory only and are not restrictive.

Exemplary embodiments may provide a system and method for providing performance testing. That is, exemplary embodiments may, among other things, expand and optimize performance of network elements within network computing environments by comprehensively and effectively providing Transmission Control Protocol (TCP) performance testing.

As discussed above, performance testing in computing environments typically involves various network elements, such as routers or switches. Because network elements play an important role in telecommunications systems and how managed network service features are delivered, performance testing may determine how a particular network element performs under a specified workload. Performance testing may also serve to validate or verify additional quality attributes, such as scalability, reliability, throughput capacity, resource usage, etc.

Traditional performance testing methodologies are generally directed to User Datagram Protocol (UDP) under Request for Comment (RFC) guidelines. UDP performance testing is limited and does not account for multiple types of traffic that a network element experiences. UDP performance testing may be accurate for testing stateless traffic, where parsing of individual packets occurs without any context preservation to any related stream of information. Information is simply being passed off. However, stateful traffic depends on packet pattern matching and decoding of underlying protocols and their states through their evolution. In other words, stateful traffic involves tracking dynamic negotiations or "handshakes" with both ends of traffic where information is travelling at constantly-changing speeds. Providing Transmission Control Protocol (TCP) performance testing according to various embodiments, a comprehensive and efficient way to facilitate performance testing of stateful traffic at a network element may be provided.

According to various embodiments, TCP performance testing techniques and methodologies may provide a streamlined approach for testing performance of network elements that operate in stateful traffic. TCP performance testing may reduce or eliminate traditional testing inefficiencies and ultimately optimize network performance and reliability.

Figure 1:
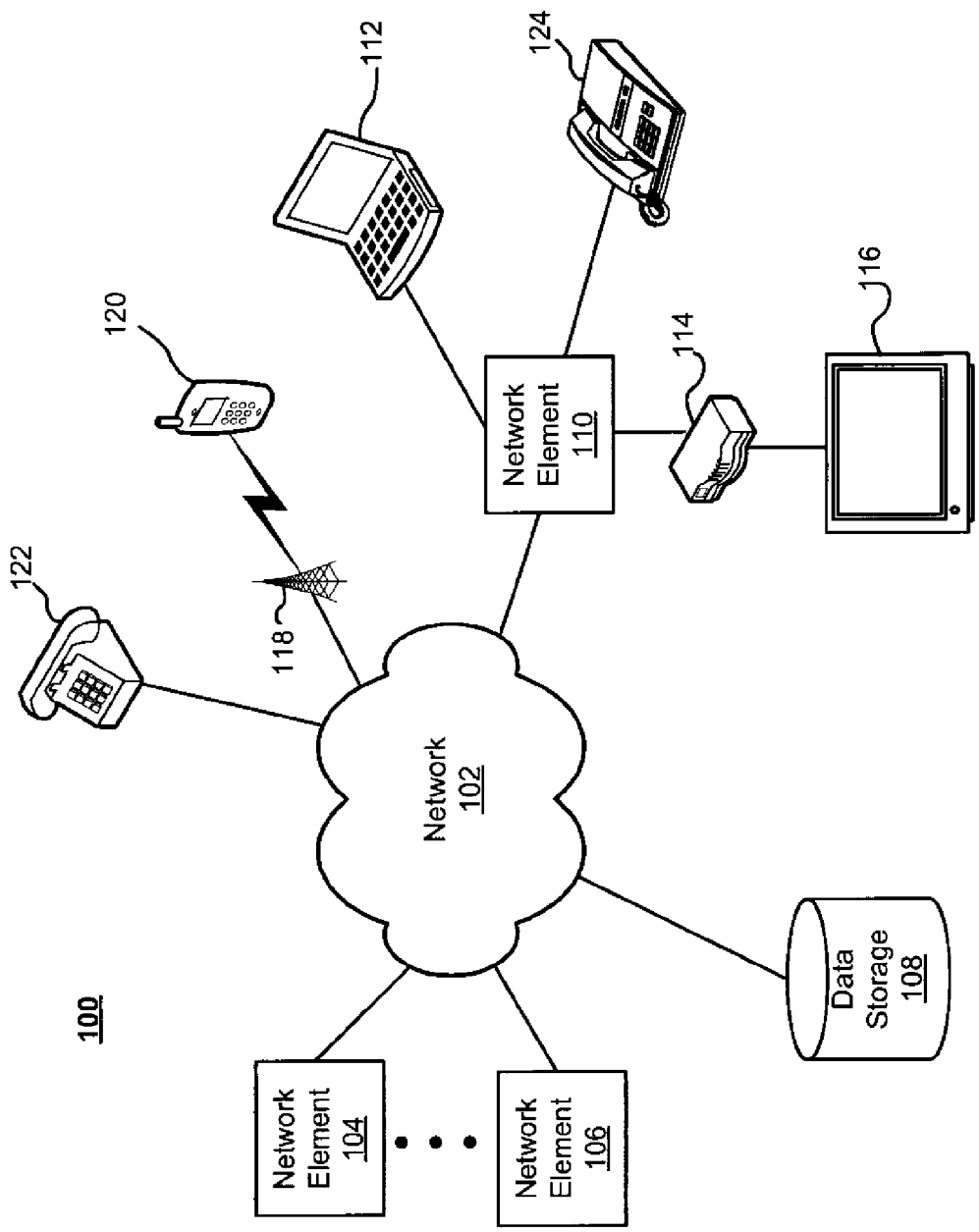
FIG. 1 depicts a block diagram of a system architecture for providing TCP performance testing, according to an exemplary embodiment.

FIG. 1 depicts a block diagram of a system architecture for providing TCP performance testing 100, according to an exemplary embodiment. As illustrated, network 102 may be communicatively coupled with one or more devices including network element 104, network element 106, data storage 108, and network element 110. Other devices may be communicatively coupled with network 102 via one or more intermediary devices, such as transceiver 118, network element 110, or a wireline phone 122. Wireless device 120 may be communicatively coupled with network 102 via transceiver 118. Network client 112 and set-top box 114 may be communicatively coupled with network 102 via network element 110. Wireless control 110 may be communicatively coupled with set-top box 114 via infrared, Bluetooth communication, or other wireless technologies. A video display (e.g., television set 116) may be communicatively coupled to set-top box 114. It should also be appreciated that other various components may also be communicatively coupled with the network element 110, such as a Voice over Internet Protocol ("VoIP") phone 124.

Network 102 may be a wireless network, a wired network or any combination of wireless network and wired network. For example, network 102 may include one or more of a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting or receiving a data signal. In addition, network 102 may include, without limitation, telephone line, fiber optics, IEEE Ethernet 802.3, a wide area network ("WAN"), a local area network ("LAN"), or a global network such as the Internet. Also, network 102 may support, an Internet network, a wireless communication network, a cellular network, or the like, or any combination thereof. Network 102 may further include one, or any number of the exemplary types of networks mentioned above operating as a stand-alone network or in cooperation with each other. Network 102 may utilize one or more protocols of one or more network elements to which it is communicatively coupled. Network 102 may translate to or from other protocols to one or more protocols of network devices. Although network 102 is depicted as one network, it should be appreciated that according to one or more embodiments, network 102 may comprise a plurality of interconnected networks, such as, for example, a service provider network, the Internet, a broadcaster's network, a cable television network, corporate networks, or home networks.

Network elements 104, 106, 110, and data storage 108 may transmit and receive data to and from network 102 representing broadcast content, user request content, mobile communications data, or other data. The data may be transmitted and received utilizing a standard telecommunications protocol or a standard networking protocol. For example, one embodiment may utilize Session Initiation Protocol ("SIP"). In other embodiments, the data may be transmitted or received utilizing other Voice Over IP ("VoIP") or messaging protocols. For example, data may also be transmitted or received using Wireless Application Protocol ("WAP"), Multimedia Messaging Service ("MMS"), Enhanced Messaging Service ("EMS"), Short Message Service ("SMS"), Global System for Mobile Communications ("GSM") based systems, Code Division Multiple Access ("CDMA") based systems, Transmission Control Protocol/Internet ("TCP/IP") Protocols, or other protocols and systems suitable for transmitting and receiving data. Data may be transmitted and received wirelessly or may utilize cabled network or telecom connections such as an Ethernet RJ45/Category 5 Ethernet connection, a fiber connection, a traditional phone wireline connection, a cable connection or other wired network connection. Network 102 may use standard wireless protocols including IEEE 802.11a, 802.11b and 802.11g. Network 102 may also use protocols for a wired connection, such as an IEEE Ethernet 802.3.

Transceiver 118 may be a repeater, a microwave antenna, a cellular tower, or another network access device capable of providing connectivity between to different network mediums. Transceiver 118 may be capable of sending or receiving signals via a mobile network, a paging network, a cellular network, a satellite network or a radio network. Transceiver 118 may provide connectivity to one or more wired networks and may be capable of receiving signals on one medium such as a wired network and transmitting the received signals on a second medium, such as a wireless network.

Wireless device 120 may be a mobile communications device, wireline phone, a cellular phone, a mobile phone, a satellite phone, a personal digital assistant ("PDA"), a computer, a handheld MP3 player, a handheld multimedia device, a personal media player, a gaming device, or other devices capable of communicating with network 102 via transceiver 118.

Network elements, transceiver 118, data storage 108, and set-top box 114 may include one or more processors for recording, transmitting, receiving, or storing data. Although network elements, transceiver 118 and data storage 108 are depicted as individual elements, it should be appreciated that the contents of one or more of a network element, transceiver 118, and data storage 108 may be combined into fewer or greater numbers of devices and may be connected to additional devices not depicted in FIG. 1. Furthermore, the one or more devices may be local, remote, or a combination thereof a first network elements, transceiver 118, and data storage 108.

Data storage 108 may be network accessible storage and may be local, remote, or a combination thereof to network elements 104, 106, and 110. Data storage 108 may utilize a redundant array of inexpensive disks ("RAID"), tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), or other computer accessible storage. In one or more embodiments, Data storage 108 may be a database, such as an Oracle database, a Microsoft SQL Server database, a DB2 database, a MySQL database, a Sybase database, an object oriented database, a hierarchical database, or other database. Data storage 108 may utilize flat file structures for storage of data.

Network elements 104, 106, and 110 may be one or more servers (or server-like devices), such as a Session Initiation Protocol ("SIP") server. Network elements 104, 106, and 110 may include one or more processors (not shown) for recording, transmitting, receiving, or storing data. According to one or more embodiments, network elements 104, 106, and 110 may be servers providing media content to one or more users. In other embodiments, network elements 104, 106, and 110 may be servers that provide network connection between two or more wireless devices 118. Network elements 104, 106, and 110 may also be servers of a service provider, the Internet, a broadcaster, a cable television network, or another media provider.

Network element 110 may be a residential gateway, such as a router, an optical network terminal or another piece of Customer Premises Equipment ("CPE") providing access to one or more pieces of equipment. For example, network element 110 may provide audio/video programming content feeds to a set-top box, such as set-top box 116. Network element 110 may also provide network connectivity for other clients, such as a Voice Over IP ("VoIP") phone (not shown) and a network client, e.g., network client 112.

Network client 112 may be a desktop computer, a laptop computer, a server, a personal digital assistant, or other computer capable of sending or receiving network signals (e.g., CPE, a television, radio, phone, appliance, etc.). Network client 112 may use a wired or wireless connection. It should also be appreciated that the network client 112 may be a portable electronic device capable of being transported. For example, these may include a digital picture frame, an electronic reader device, or other portable device. Such a device may transmit or receive signals and store information in transit, and in the event it is transported out of the unit, the portable electronic device may still operate using the data (e.g., digital image, electronic book, etc.) it stored. Although depicted as connected via a residential gateway in FIG. 1, it should be appreciated that the network client 112 may connect directly to network 102 or via other network connectivity devices as well. According to one or more embodiments, network client 112 using a wireless connection may authenticate with a network using Wired Equivalent Privacy ("WEP"), Wi-Fi Protected Access ("WPA"), or other wireless network security standards.

System 100 may be used for mobile telecommunications between two or more components of the system 100, e.g., two or more wireless devices, wireless device with network client, set top box with wireless device, landline phone, VoIP, etc. System 100 may also be used for transmitting or receiving a variety of content. The various components of system 100 as shown in FIG. 1 may be further duplicated, combined or integrated to support various applications and platforms. Additional elements may also be implemented in the systems described above to support various applications.

It should be appreciated that the term, "network element," as used herein, may refer to any device under test (DUT), such as routers and switches. The term, "network element" may also refer specifically to any of the network elements identified above or, more generally, to any component associated with system 100, as described above. These may include, but are not limited to, vendor-side components 104-108, subscriber-side components 110-124, or any other device communicatively coupled to network 102 or association with system 100.

Figure 2:
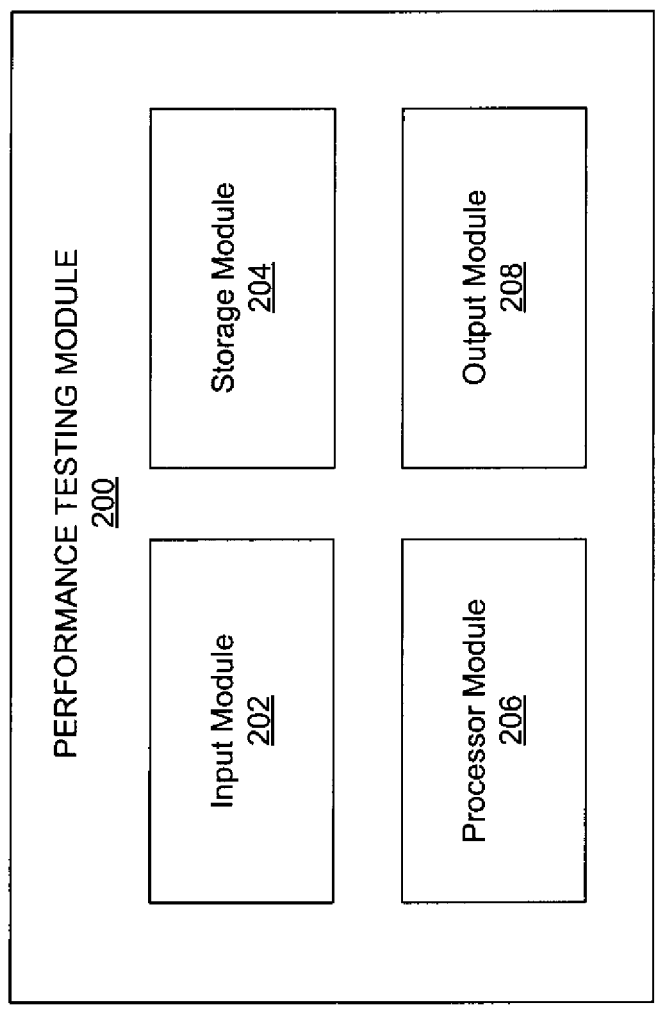
FIG. 2 depicts a hardware module component of a system for providing TCP performance testing, according to an exemplary embodiment.

FIG. 2 depicts a hardware module component of a system for providing TCP performance testing 200, according to an exemplary embodiment. Referring to FIG. 2, there is shown a performance testing module 200 for providing TCP performance testing. The performance testing module 200 may be communicatively coupled to at least one of a network element, a traffic generator, or a combination thereof.

As illustrated, the performance testing module 200 may comprise one or more components, such as an input module 202, a storage module 204, a processor module 206, and an output module 208. Although the performance testing module 200 is depicted as a single module, the performance testing module 200 may be incorporated as a single component or may be distributed across a plurality of physical components, such as one or more centralized servers, pieces of customer premises equipment, or end user devices. In some embodiments, the performance testing module 200 may be utilized in a virtual environment or as software.

Input module 202 may receive one or more inputs. These may include input information identifying one or more configurations, settings, parameters, directions, modifications, and instructions for conducting a TCP performance test. These may include, but are not limited to, objective rate, MSS, sustain time, etc., which may be used in performance testing.

Storage module 204 may manage or access the one or more inputs using electronic storage, including databases or other organized electronic storage. Storage module 204 may provide one or more interfaces for the input module 202, processor module 206, or output module 208. Storage module 204 may store any data associated with the input module 202, processor module 206, and output module 208. Storage module 204 may be or may be communicatively coupled to one or more physical media, such as, but not limited to, a data storage unit, a server, a compact disc (CD), a digital versatile disc (DVD), a floppy disk, a hard drive, read only memory (ROM), random access memory (RAM), as well as other physical media capable of storing software, data, other storage information, or combinations thereof.

Processor module 206 may process data. For example, processor module 206 may process the inputted data and generate traffic useful for performance testing. In some embodiments, the processor module 206 may generate a continuous bidirectional TCP traffic stream for TCP performance testing of one or more network devices based on data from the input module 202 or the storage module 204.

Output module 208 may present a variety of information for presentation. For example, the output module 208 may output the results of performance testing. These results may be output in a variety of reporting formats, such as a spreadsheet format or other format. The output module 208 may also output results that may be reused for further processing at the processor module 206.

It should be appreciated that the system 100 of FIG. 1 and the system 200 of FIG. 2 may be implemented in a variety of ways. The architectures 100 and 200 may be implemented as a hardware component (e.g., as a module) within a network element or network box. It should also be appreciated that the architectures 100 and 200 may be implemented in computer executable software (e.g., on a computer-readable medium). Although depicted as a single architecture, module functionality of the architectures 100 and 200 may be located on a single device or distributed across a plurality of devices including one or more centralized servers and one or more pieces of customer premises equipment or end user devices.

Figure 3:
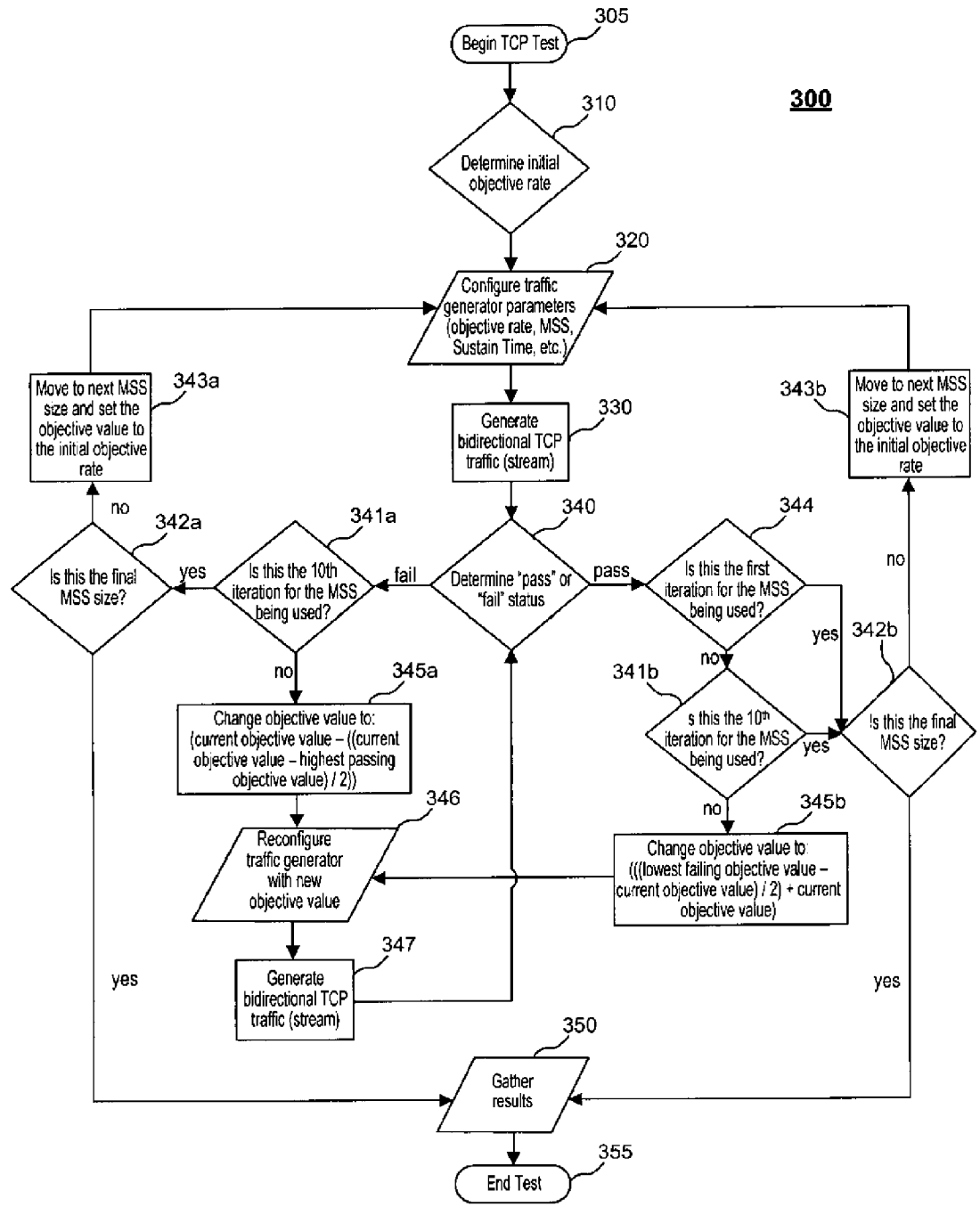
FIG. 3 depicts an illustrative flow for providing TCP performance testing, according to an exemplary embodiment.

FIG. 3 depicts an illustrative flow for providing TCP performance testing 300, according to an exemplary embodiment. The exemplary flow 300 is provided by way of example, as there are a variety of ways to carry out methods disclosed herein. The flow 300 shown in FIG. 3 may be executed or otherwise performed by one or a combination of various systems. The flow 300 is described below as carried out by at least system 100 in FIG. 1 and system 200 in FIG. 2, by way of example, and various elements of systems 100 and 200 are referenced in explaining the exemplary flow of FIG. 3. Each block shown in FIG. 3 represents one or more processes, methods, or subroutines carried in the exemplary flow 300. A computer readable medium comprising code which when executed performs the flow 300 may also be provided. Referring to FIG. 3, the exemplary flow 300 may begin at block 305.

At block 305, performance (e.g., TCP performance testing) may be begin. In this example, the performance testing module 200 may be used for performance testing of one or more network elements.

It should be appreciated that performance testing may involve measuring TCP throughput for one or more network elements, such as enterprise customer premise equipment (ECPE) with managed network service features. The flow 300 may provide blocks that seek to provide consistency with guidelines presented in various certified documents, such as those outlined in RFC documents. Flow 300 may focus on performance testing of TCP throughput measurements using the performance testing module 200 in order to create a reliable, reproducible, and standardized testing methodology.

At block 310, an initial objective rate may be determined at the performance testing module 200. For automated scripts, this may often be a maximum objective value, which may later be stepped down, or an initial objective which may be either stepped up or down in 50% increments form the previously ran value. In other words, the initial objective rate may be identified as the fastest speed for a port on the network element being tested. Therefore, if a gigabit Ethernet interface is being used, then the initial objective rate may be 1,000 megabit per second (or 1 gigabit per second). In most cases, it should be appreciated that an embedded gigabit Ethernet port may apply.

At block 320, parameters for generating traffic using a traffic generator may be configured or provided. In addition to configuring objective rate to the fastest speed for a port on the network element being tested (e.g., 1,000 megabit/per/second), as described above, other various parameters may also be configured. These may include maximum segment size (MSS) values, sustain time, HTTP settings, objective throughput, page size, and other various configurations or settings for generating traffic for performance testing.

Various tests described herein may be performed with multiple MSS values. It should be appreciated that MSS sizes may include maximum and minimum legitimate sizes for the protocol under test, on the media under test, and enough sizes in between to be able to get a full characterization of the network element performance. In some embodiments five frame sizes may be tested for each test condition. For example, for ECPE, sample MSS values useful for performance testing may include: 78, 256, 512, 1280, and 1518. It should be appreciated that the smaller the MSS value, a larger amount of processing is required (and therefore a greater impact on the network element being tested), and the larger the MSS value, a smaller amount of processing is required (and therefore a lesser impact on the network element being tested). A large MSS value of 1518 may represent browsing the Internet whereas a small MSS value of 78 may represent voice communications (e.g., VoIP). Using five MSS values for testing may therefore provide a broad range to cover a general range of impact at the tested network element. It should be appreciated that fewer or greater MSS values may be configured for performance testing as well.

For optimum testing conditions, the duration of the test portion of each trial may be set for approximately two minutes. Therefore, sustain times may be set for approximately two minutes, with requisite ramp up and ramp down time as well.

It should be appreciated that traffic settings may also be configured. For example, TCP acceleration may be set to ON for traffic amounts greater than 500 Mbps and TCP acceleration may be set to OFF for traffic amounts less than 500 Mbps.

It should be appreciated that normal network activity may also not all be in a single direction. For example, to test bidirectional performance of a network element, a test series may be run with the same data rate being offered from each direction.

Provided below are exemplary screens for configuring one or more settings/parameters for traffic generation at a traffic generator communicatively coupled to the performance testing module 200.

Figure 4A:
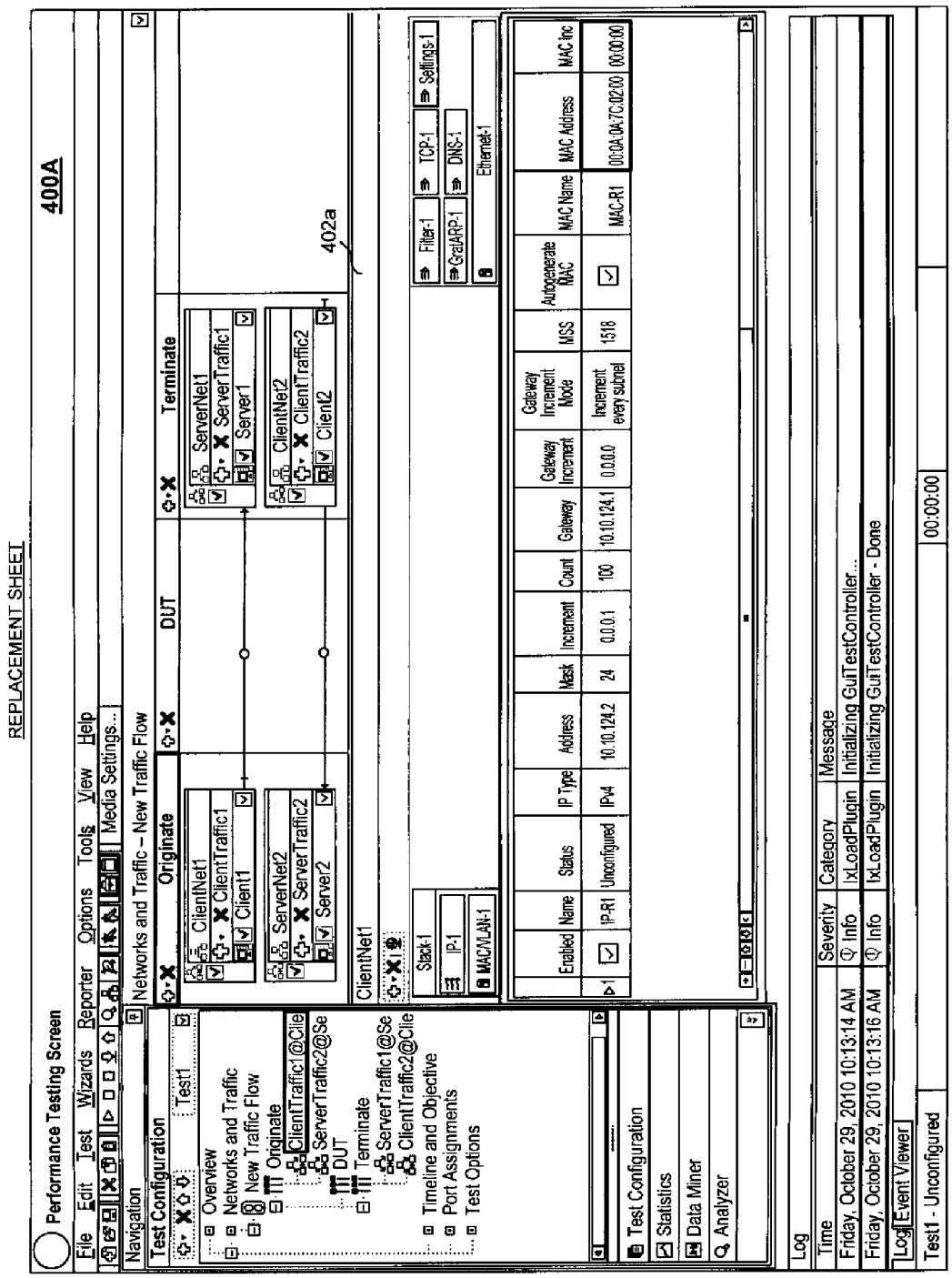
FIG. 4A depicts an illustrative screen of IP and MSS configurations for a first client network for providing TCP performance testing, according to an exemplary embodiment.

FIG. 4A depicts an illustrative screen of IP and MSS configurations for a first client network for providing TCP performance testing 400A, according to an exemplary embodiment. In this example, the first client network may be "ClientNet1" 402a. As shown in screen 400A, various configurations (e.g., IP information, MSS value, etc.), may be configured for a first client network 402.

Figure 4B:
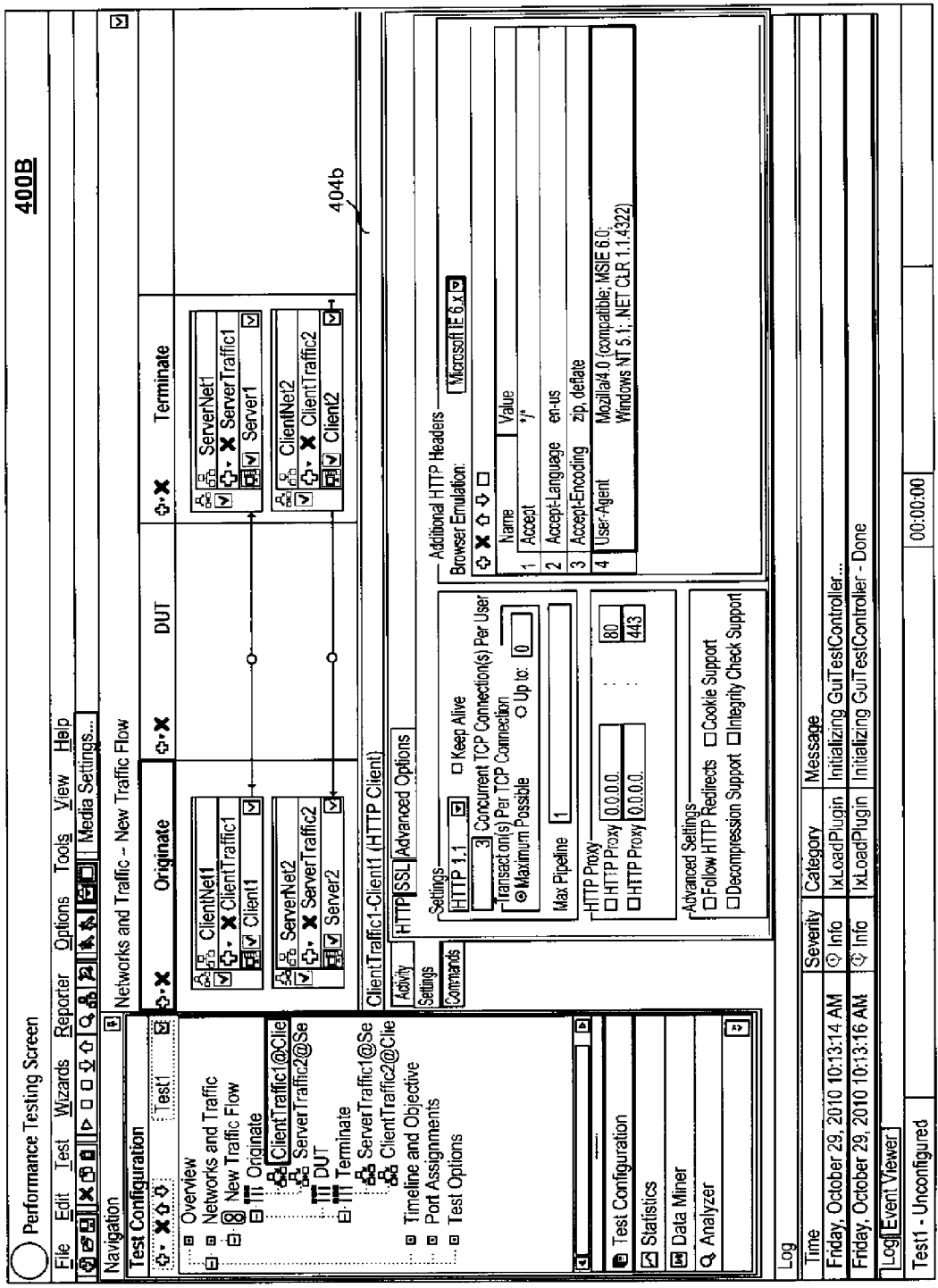
FIG. 4B depicts an illustrative screen of HTTP settings for a first client network for providing TCP performance testing, according to an exemplary embodiment.

FIG. 4B depicts an illustrative screen of HTTP settings for a first client network for providing TCP performance testing 400B, according to an exemplary embodiment. In this example, HTTP settings 404b for the first client network 402a may be configured.

Figure 4C:
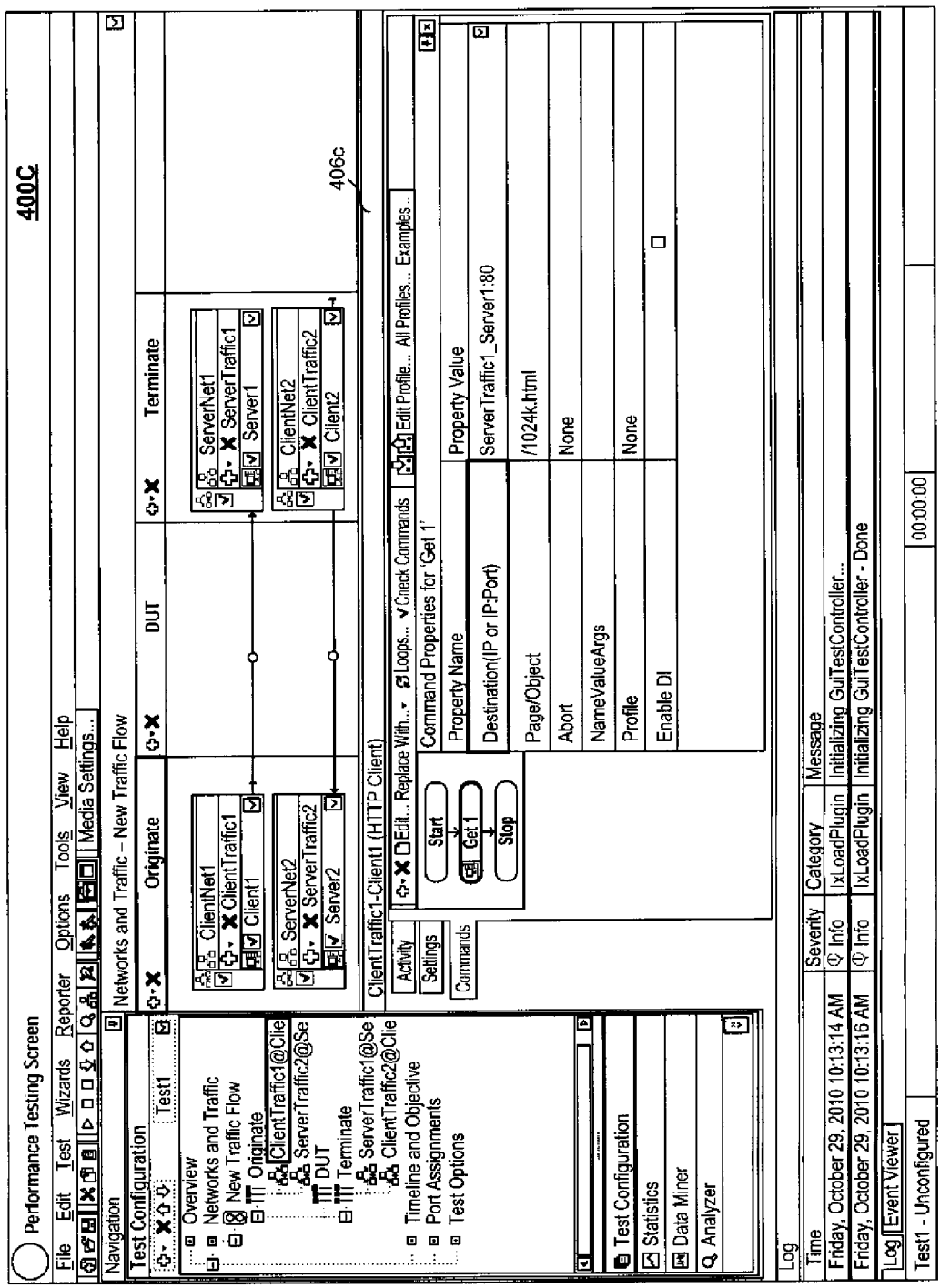
FIG. 4C depicts an illustrative screen of command and page size configurations for a first client network for providing TCP performance testing, according to an exemplary embodiment.

FIG. 4C depicts an illustrative screen of command and page size configurations for a first client network for providing TCP performance testing 400C, according to an exemplary embodiment. In this example, the first client network may be configured to send an HTTP "get" request to the first server network by configuring command and page size settings 406c. Here, the "get" request may be a "Get1" request and the page size may be configured to 1024 k.

Figure 4D:
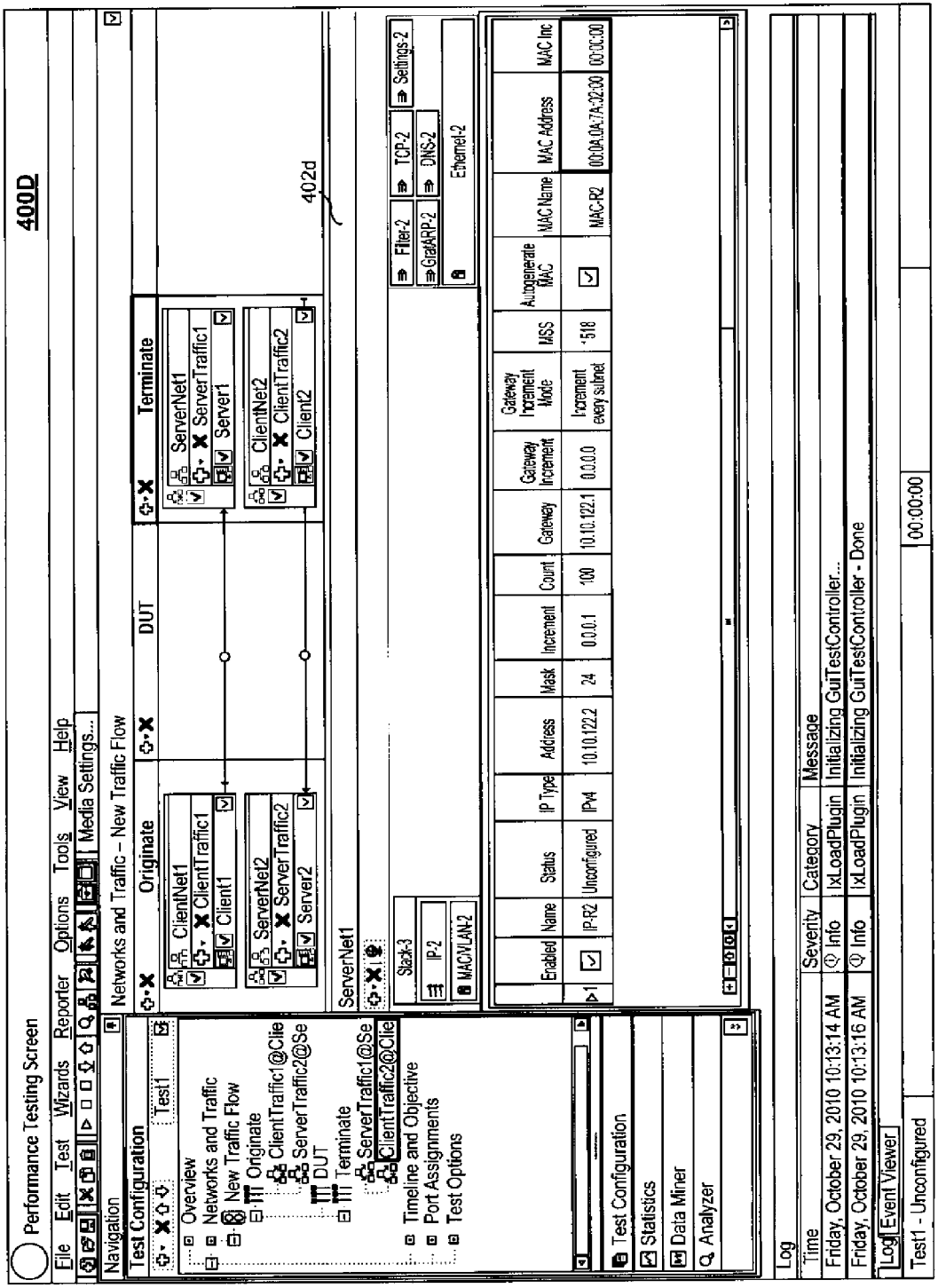
FIG. 4D depicts an illustrative screen of IP and MSS configurations for a first server network for providing TCP performance testing, according to an exemplary embodiment.

FIG. 4D depicts an illustrative screen of IP and MSS configurations for a first server network for providing TCP performance testing 400D, according to an exemplary embodiment. In this example, the first server network may be "ServerNet1" 402d. As shown in screen 400A, various configurations (e.g., IP information, MSS value, etc.), may be configured for a first server network 402.

Figure 4E:
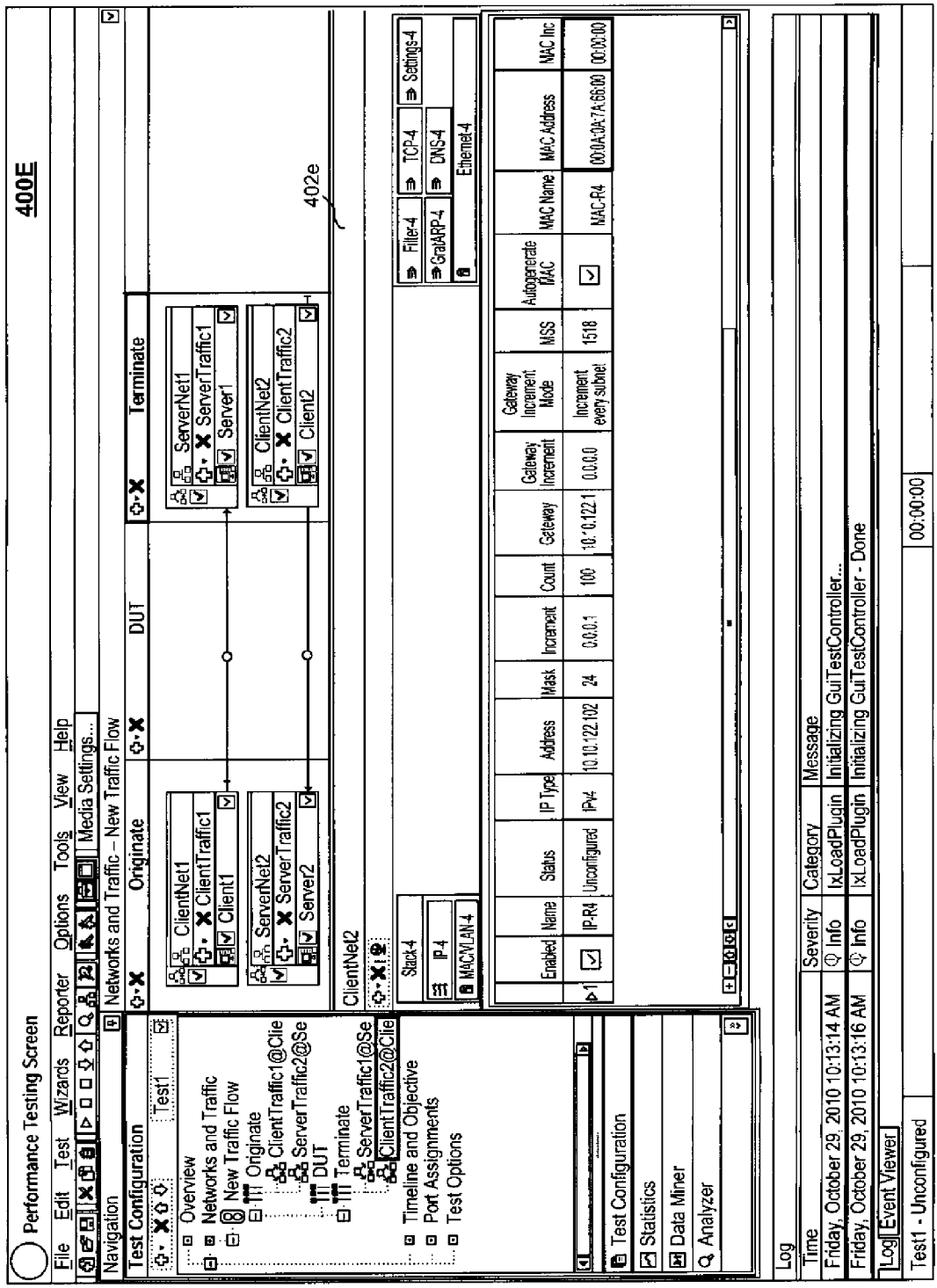
FIG. 4E depicts an illustrative screen of IP and MSS configurations for a second client network for providing TCP performance testing, according to an exemplary embodiment.

FIG. 4E depicts an illustrative screen of IP and MSS configurations for a second client network for providing TCP performance testing 400E, according to an exemplary embodiment. In this example, the second client network may be "ClientNet2" 402e. As shown in screen 400A, various configurations (e.g., IP information, MSS value, etc.), may be configured for a second client network 402.

Figure 4F:
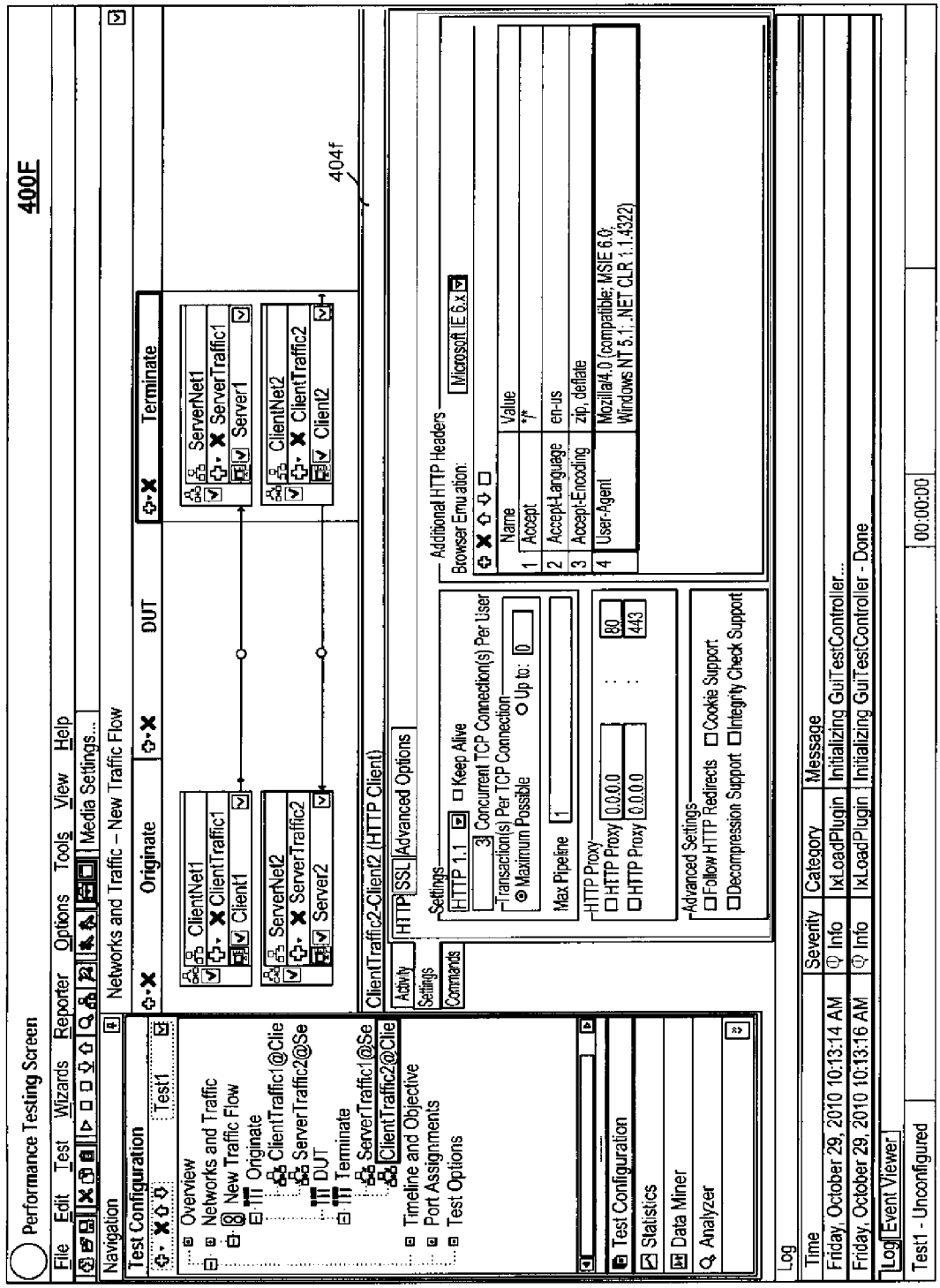
FIG. 4F depicts an illustrative screen of HTTP settings configurations for a second client network for providing TCP performance testing, according to an exemplary embodiment.

FIG. 4F depicts an illustrative screen of HTTP settings configurations for a second client network for providing TCP performance testing 400F, according to an exemplary embodiment. In this example, HTTP settings 404f for the second client network 402e may be configured.

Figure 4G:
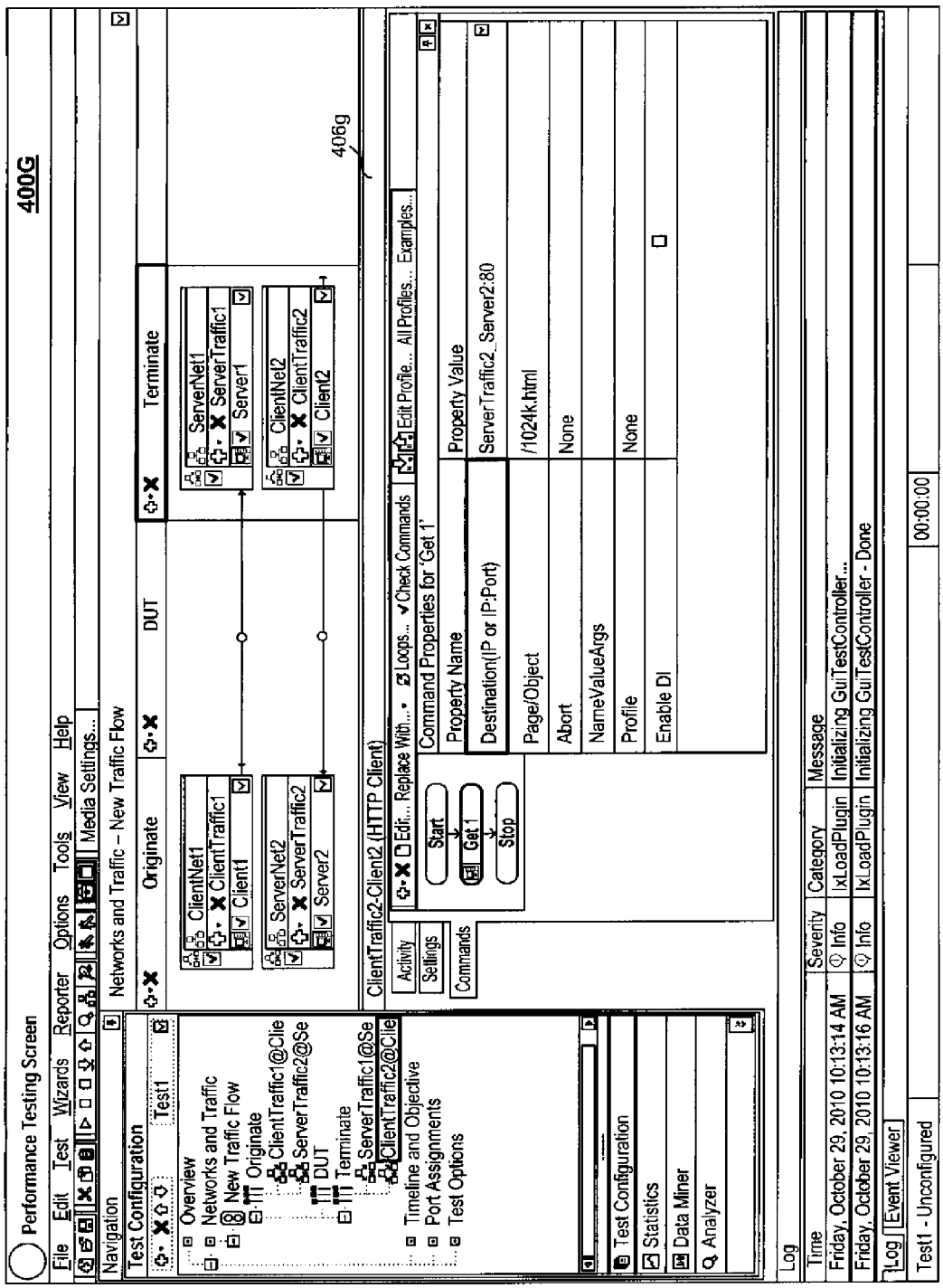
FIG. 4G depicts an illustrative screen of command and page size configurations for a second server network for providing TCP performance testing, according to an exemplary embodiment.

FIG. 4G depicts an illustrative screen of command and page size configurations for a second server network for providing TCP performance testing 400G, according to an exemplary embodiment. In this example, the second client network may be configured to send an HTTP "get" request to the second server network by configuring command and page size settings 406g. Here, the "get" request may be a "Get1" request and the page size may be configured to 1024 k.

Figure 4H:
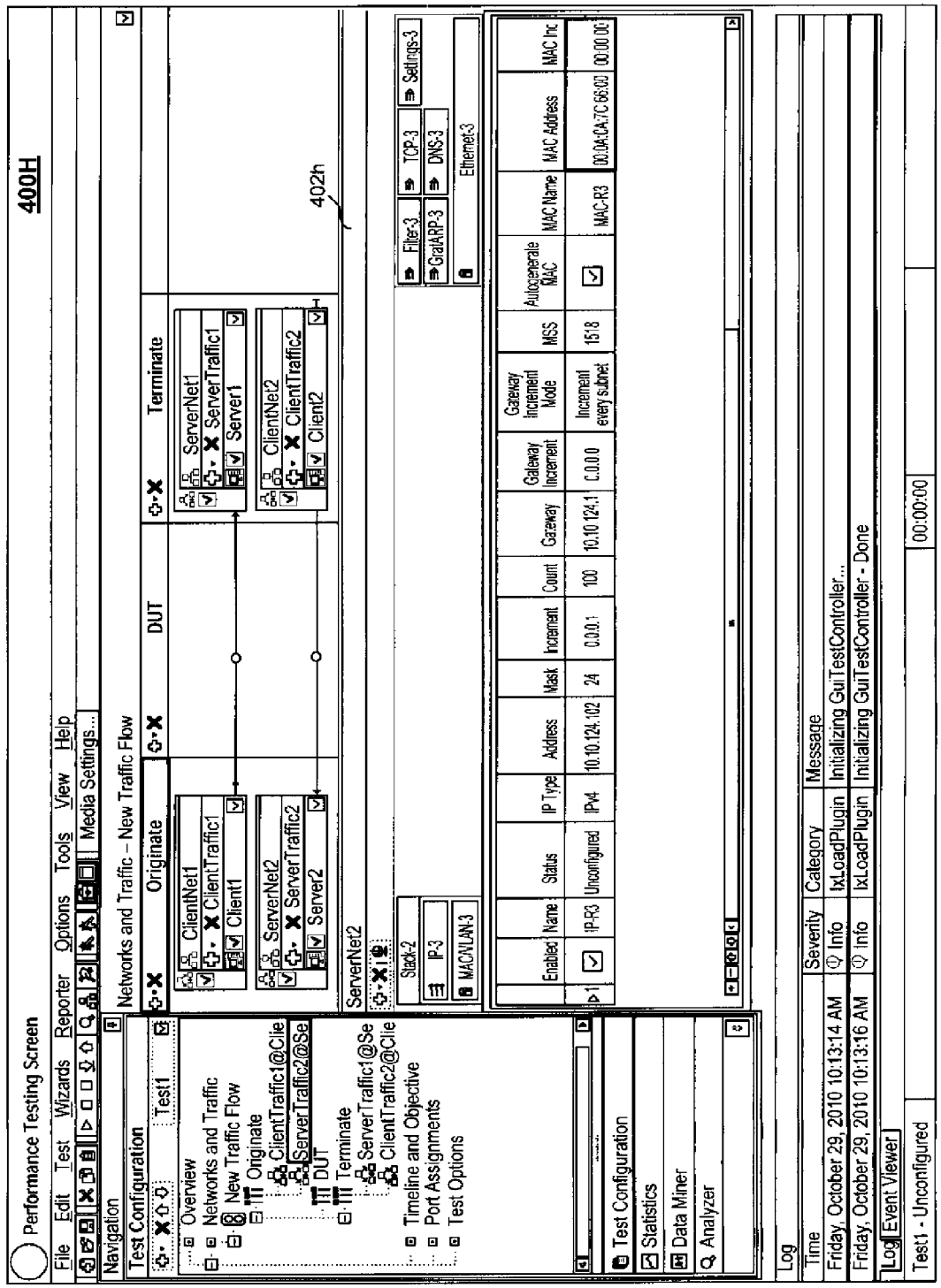
FIG. 4H depicts an illustrative screen of IP and MSS configurations for a client network for providing TCP performance testing, according to an exemplary embodiment.

FIG. 4H depicts an illustrative screen of IP and MSS configurations for a sever network for providing TCP performance testing 400H, according to an exemplary embodiment. In this example, the second server network may be "ServerNet2" 402h. As shown in screen 400A, various configurations (e.g., IP information, MSS value, etc.), may be configured for a second server network 402.

Figure 4I:
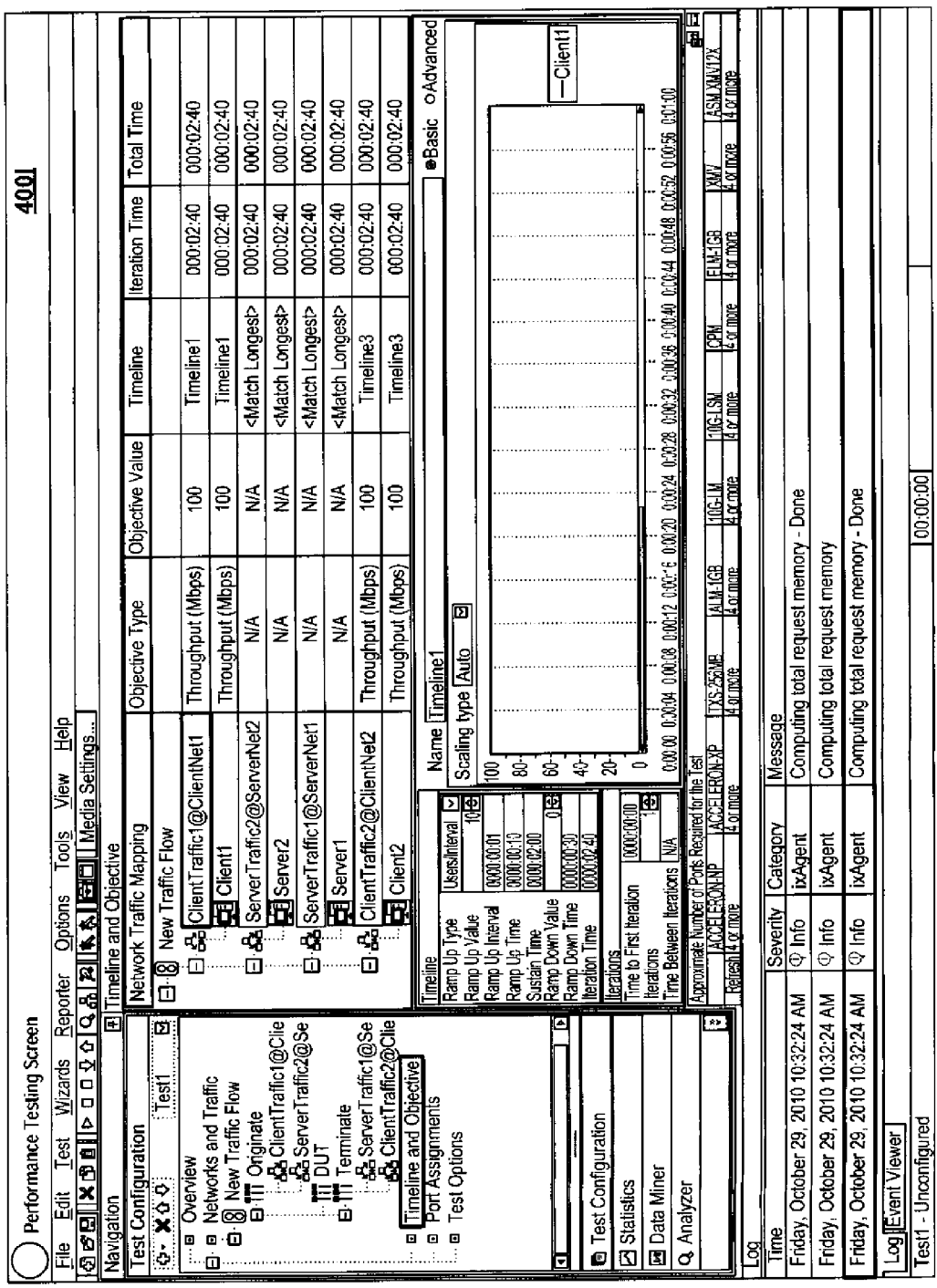
FIG. 4I depicts an illustrative screen for establishing a timeline and throughput objective for providing TCP performance testing, according to an exemplary embodiment.

FIG. 4I depicts an illustrative screen for establishing a timeline and throughput objective for providing TCP performance testing 400I, according to an exemplary embodiment. A ramp up value, a ramp down time, a sustain time, and a throughput objective may be configured in this screen.

An exemplary time line (in minutes) for performance testing may be as follows:
  Ramp Up Value—00:10
  Ramp Interval—00:01
  Sustain Time—2:00
  Ramp Down Time—00:30
  Total test duration—2:40

While various sustain times for performance testing may be employed, an optimum sustain time for performance testing may be approximately 2:00 minutes, as discussed above. A ramp up value of approximately 10 seconds may be required for proper "warm up" and a ramp down time of approximately 30 seconds may be required for proper "cool down." In effect, the ramp up value may give a traffic generator the time it needs to generate, for example, 1 full gigabit per second of traffic in the event such a value is configured. The ramp down time may give the traffic generator the time it needs to reduce traffic and to be ready for the next cycle of performance testing.

It should be appreciated that "TCP throughput," as used herein, may be defined by the as a maximum rate at which less than 5% offered bi-directional traffic is dropped by the device. This TCP throughput definition may allow a network element to report a single value, which may have proven use in computing environments and marketplaces. Furthermore, this definition of TCP throughput may apply to testing managed service through the largest interface speed configured on a device under test or a target network element. In screen 4001, the throughput objective value may be set at 100 Mbps.

It should be appreciated that a variety of other performance testing screens may also be provided, and those described above are merely exemplary.

Referring back to flow 300 of FIG. 3, once the various parameters for generating traffic is configured at block 320, flow 300 may proceed to block 330.

At block 330, a traffic stream may be generated by a traffic generator communicatively coupled to the performance testing module 200. In some embodiments, a bidirectional TCP traffic stream may be generated for performance testing of the target network element. It should be appreciated that a constant streams of traffic for a single MSS size, e.g., the MSS value initially configured, may be transmitted for a predetermined duration, e.g., two minutes of sustain time.

At block 340, a performance "pass" or "fail" may be determined by determining an amount of traffic loss. This may be achieved by analyzing and processing, for example, throughput levels, e.g., via a HTTP Client Throughput graph located under the Statistics tab of a performance screen (not shown).

The performance testing module 200 may also verify that whether traffic is symmetrical (bidirectional). In some embodiments, traffic may be considered symmetrical if traffic going in both directions is within 5% of each other. In other words, traffic is symmetrical if "sent" throughput rates are within 5% of "received" throughput rates.

If traffic loss was not experienced at the initial object rate, a test run is thought to be completed. If more than 5% traffic loss was experienced, the performance testing module may adjust the transmission rate lower in 50% incremental units from a previously ran rate. If zero traffic loss was experienced adjust the transmission rate higher in 50% incremental units from the previously ran objective value.

In other words, referring to flow 300 of FIG. 2, if traffic loss was more than 5%, performance of the network element may fail. The performance testing module 200 may inquire whether this was the $10^{th}$ iteration for the particular MSS value being used 341a. If not, the objective value may be stepped up or stepped down by 50% increments from the previously ran rate. For example, at block 345a, an objective value may be changed by the following relationship:

(current objective value−(current objective value−
highest passing objective value)/2))

Using this new objective value, the traffic generator may be reconfigured, as depicted in block 346, to generate a new bidirectional TCP traffic stream, as depicted in block 347. The cycle may terminate after ten iterations, although the number of iterations may be greater or lesser. It should be appreciated that the greater the number of testing cycles, the greater the "fine tuning" effect. In general, ten iterations may provide more than sufficient testing cycles to determine the throughput rate of the network element being tested.

After ten iterations, flow 300 may proceed to inquire whether the MSS value is the final size, as shown in block 342a. If not, flow 300 may proceed to test the next MSS value and set the objective value to the initial objective rate at block 320. In other words, blocks 320-347 may be repeated for each predetermined MSS value configured in block 320 until it is determined at which rate the network element may transmit the objective value with less than 5% traffic loss.

It should be appreciated that a similar flow may occur if the network element is determined to "pass" at block 340, meaning traffic may be considered symmetrical if traffic going in both directions is within 5% of each other. In other words, if traffic loss was less than 5%, performance of the network element may pass and the performance testing module 200 may inquire whether this was this was the first iteration 344. If so, then the flow 300 may continue to the next MSS size until final 342b and reset the objective value to the initial objective rate accordingly. If not, the flow 300 may inquire whether this was the $10^{th}$ iteration for the particular MSS value being used 341b. If not, the objective value may be stepped up or stepped down by 50% increments from the previously ran rate. For example, at block 346, an objective value may be changed by the following relationship:

(((lowest failing objective value−current objective
value)/2)+current objective value)

Similar to the "fail" scenario, using this new objective value, the traffic generator may be reconfigured, as depicted in block 346, to generate a new bidirectional TCP traffic stream, as depicted in block 347. The cycle may terminate after ten iterations, although the number of iterations may be greater or lesser. It should be appreciated that the greater the number of testing cycles, the greater the "fine tuning" effect on performance testing results for the network element being tested.

At block 350, results from performance testing may be collected and gathered. These results may be output by the output module 208 of the performance testing module 200 in various reporting formats, such as spreadsheet or other various reporting formats. In some embodiments, these results may be stored in the storage module 204 for future use, etc.

At block 355, performance (e.g., TCP performance testing) may be end. In this example, the performance testing module 200 may be terminated performance testing of one or more network elements.

Other various embodiments and considerations may also be provided to optimize the TCP performance testing described above. While embodiments described above are primarily directed to performance testing in TCP, it should be appreciated that the performance testing module 200 and flow 300 may also be used for other environments or protocols. It should also be appreciated that embodiments for performance testing may be configured for operation by one or more users, analysts, operators, or administrators, with various levels of privilege. In other embodiments, the TCP performance testing may be entirely automatic or may be a combination of manual and automatic features.

While depicted as various servers, components, elements, modules, or devices, it should be appreciated that embodiments may be constructed in software or hardware, as a separate or stand-alone device, or as part of an integrated system, device, or tool.

Additionally, it should also be appreciated that system support and updating the various components of the system, module, or flow may be achieved. For example, a system administrator may have access to one or more of the components of the system, network, components, elements, or device. It should also be appreciated that the one or more servers, components, elements, or devices of the system may not be limited to physical components. These components may be computer-implemented software-based, virtual, etc. Moreover, the various servers, components, elements, or devices may be customized to perform one or more additional features and functionalities. Such features and functionalities may be provided via deployment, transmitting or installing software or hardware.

It should also be appreciated that each of the communications devices, servers, modules, or network elements may include one or more processors. It should be appreciated that one or more data storage systems (e.g., databases) may also be coupled to each of the devices or servers of the system. In one embodiment, the one or more data storage systems may store relevant information for each of the servers and system components. It should also be appreciated that software may be implemented in one or more computer processors, modules, network components, services, devices, or other similar systems.

It should be appreciated that the contents of any of these one or more data storage systems may be combined into fewer or greater numbers of data storage systems and may be stored on one or more data storage systems or servers. Furthermore, the data storage systems may be local, remote, or a combination thereof to client systems, servers, or other system components. In another embodiment, information stored in the databases may be useful in providing additional personalizations and customizations.

By providing performance testing according to the above embodiments, a more efficient, accurate, and comprehensive way may be provided for quantifying the performance capabilities of a network element. Improved resource management, optimized network services, and cost efficiencies may also be achieved.

Figure 5:
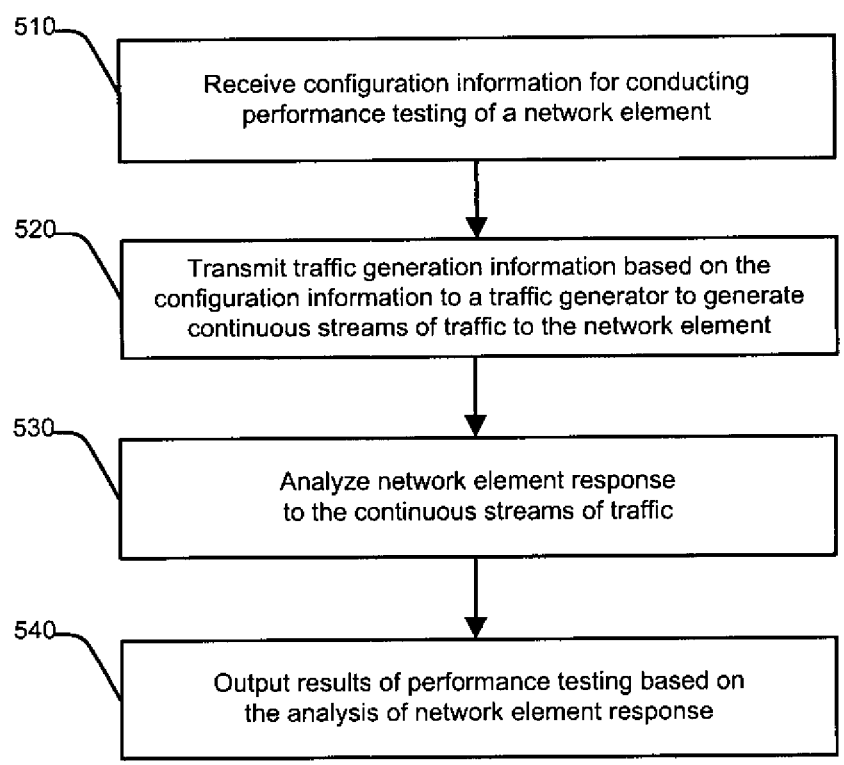
FIG. 5 depicts an illustrative flowchart of a method for TCP performance testing, according to an exemplary embodiment.

FIG. 5 depicts an illustrative flowchart of a method 500 for performance testing, according to an exemplary embodiment. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system 100 in FIG. 1 and system 200 in FIG. 2, by way of example, and various elements of systems 100 and 200 are referenced in explaining the exemplary method of FIG. 5. Each block shown in FIG. 5 represents one or more processes, methods, or subroutines carried in the exemplary method 500. A computer readable medium comprising code which when executed performs method 500 may also be provided. Referring to FIG. 5, the exemplary method 500 may begin at block 510.

At block 510, the input module 202 of FIG. 2 may be configured to receive configuration information for performance testing of a network element. In some embodiments, the configuration information may comprise at least an objective rate, a set of MSS values, and a predetermined time period for performance testing. The objective rate may be initially based on a fastest speed for a port on the network element. The set of MSS values may comprise at least five MSS values that represent a broad range of Internet traffic, as described above. The predetermined time period may comprise a sustain time period, wherein the generated continuous streams of bidirectional TCP traffic is transmitted at the objective rate for a single MSS value from the set of MSS values for at least a duration of the sustain time period.

At block 520, the output module 208 of FIG. 2 may be configured to transmit traffic generation information based on the configuration information to a traffic generator to generate continuous streams of bidirectional TCP traffic to the network element.

At block 530, the processor module 206 of FIG. 2 may be configured to analyze network element response to the continuous streams of bidirectional TCP traffic. In some embodiments, the processor module may analyzes network element response to the continuous streams of bidirectional TCP traffic for each of the MSS values of the set of MSS values.

The processor module 206 may analyze network element response by determining amount of traffic loss by measuring throughput levels for at the network element. The processor module 206 may analyze network element by verifying that the continuous streams of bidirectional TCP traffic are symmetrical, wherein the continuous streams of bidirectional TCP traffic are symmetrical when a rate of traffic throughput transmitted from the network element and a rate of traffic throughput received at the network element is within 5%.

In some embodiments where the continuous streams of bidirectional TCP traffic are symmetrical fails, it should be appreciated that the output module 208 may be further configured to transmit a new set of traffic generation information using an adjusted objective rate to a traffic generator to generate new continuous streams of bidirectional TCP traffic to the network element. In this scenario, the processor module 206 may be further configured to determine amount of traffic loss by measuring throughput levels at the network element. As described above, the output module 208 and processor module 206 may be configured to repeat the actions of transmitting and determining for at least ten iterations.

In some embodiments, the adjusted objective rate may be expressed as:

(previous objective value−((previous objective value−highest passing objective value)/2)).

In other embodiments where the continuous streams of bidirectional TCP traffic are symmetrical passes, it should be appreciated that the output module 208 may be further configured to transmit a new set of traffic generation information using an adjusted objective rate to a traffic generator to generate new continuous streams of bidirectional TCP traffic to the network element. In this scenario, the processor module may be further configured to determine amount of traffic loss by measuring throughput levels at the network element. As described above, the output module 208 and processor module 206 may be configured to repeat the actions of transmitting and determining for at least ten iterations.

In some embodiments, the adjusted objective rate may be expressed as:

(((lowest failing objective value−previous objective value)/2)+previous objective value).

At block 540, the input module 202 of FIG. 2 may be configured to output results of performance testing based on the analysis of network element response. In some embodiments, the results may be in various reportable formats, such as spreadsheet, web, or other reportable format. In other embodiments, the results may be stored for future use or reporting in the storage module 204.

It should be appreciated that an iteration of the performance test may last approximately 2 minutes and 40 seconds, which may include ramp up, test, and ramp down timelines. Due to the relatively short time to run a performance test, performance measurements may be generated quickly and efficiently. Embodiments described above may therefore provide performance testing of network elements that may be reliable, reproducible, and standardized.

The method 500 may further comprise other various features and functions associated with performance testing. For example, in some embodiments, the input module may be configured to be customized with a variety of configuration parameters for generating traffic and collecting measurements and data.

It should be appreciated that the set of instructions, e.g., the software, that configures the computer operating system to perform the operations described above may be contained on any of a wide variety of media or medium, as desired. Further, any data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by a computer.

In summary, embodiments may provide a system and method for comprehensively and effectively providing TCP performance testing. It should be appreciated that although embodiments are described primarily with performance testing technologies, the systems and methods discussed above are provided as merely exemplary and may have other various applications and implementations.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

We claim:

1. A system, comprising:
   one or more processors;
   memory having instructions stored thereon, the instructions, when executed by the one or more processors, cause the processors to:
   receive configuration information for performance testing of a network element,
   wherein the configuration information comprises at least an initial objective rate, a set of maximum segment size (MSS) values, and a predetermined time period for performance testing, wherein the initial objective rate is a fastest speed for a port on the network element;
   transmit traffic generation information based on the configuration information to a traffic generator to generate continuous streams of bidirectional and stateful Transmission Control Protocol (TCP) traffic to the network element and to output results of performance testing based on analysis of network element response;
   analyze network element response to the continuous streams of bidirectional and stateful TCP traffic, wherein the results of performance testing are based on analysis of network element response, and the instructions further cause the processors to:
   determine the amount of traffic loss by measuring throughput levels at the network element;
   verify that the continuous streams of bidirectional and stateful TCP traffic are symmetrical, wherein the continuous streams of bidirectional and stateful TCP traffic are symmetrical when a rate of traffic throughput transmitted from the network element and a rate of traffic throughput received at the network element are within a predetermined percentage of each other;
   determine whether the performance testing should continue by evaluating status of at least one of the network element response, the predetermined time period for performance testing, and the iteration of MSS value, of the set of MSS values, used for the performance testing;
   upon continuing the performance testing, transmit a new set of traffic generation information to the traffic generator based on updated configuration information using at least one of an adjusted objective rate and the next iteration of MSS value, of the set of MSS values.

2. The system of claim 1,
   wherein the continuous streams of bidirectional and stateful TCP traffic are symmetrical when a rate of traffic throughput transmitted from the network element and a rate of traffic throughput received at the network element are within 5% of each other.

3. The system of claim 2, wherein the instructions further cause the one or more processors to:
   transmit, in the event verifying that the continuous streams of bidirectional and stateful TCP traffic are symmetrical fails, a new set of traffic generation information using an adjusted objective rate to a traffic generator to generate new continuous streams of bidirectional and stateful TCP traffic to the network element;
   determine amount of traffic loss by measuring throughput levels at the network element; and
   repeat the actions of transmitting and determining for at least ten iterations until a rate is determined for each MSS value, of the set of MSS values, at which the network element transmits at the MSS value with less than 5% traffic loss.

4. The system of claim 3, wherein the adjusted objective rate is expressed as: (previous objective value−((previous objective value−highest passing objective value)/2)).

5. The system of claim 2, wherein the instructions further cause the one or more processors to:
   transmit, in the event verifying that the continuous streams of bidirectional and stateful TCP traffic are symmetrical passes, a new set of traffic generation information using an adjusted objective rate to a traffic generator to generate new continuous streams of bidirectional and stateful TCP traffic to the network element;
   determine amount of traffic loss by measuring throughput levels at the network element; and
   repeat the actions of transmitting and determining for at least ten iterations until a rate is determined for each MSS value, of the set of MSS values, at which the network element transmits at the MSS value with less than 5% traffic loss.

6. The system of claim 5, wherein the adjusted objective rate is expressed as:(((lowest failing objective value−previous objective value)/2)+previous objective value).

7. The system of claim 2, wherein the instructions further cause the one or more processors to repeat the actions of determining the amount of traffic loss and verifying that the continuous streams of bidirectional and stateful TCP traffic are symmetrical for a plurality of iterations until a rate is determined for each MSS value, of the set of MSS values, at which the network element transmits at the MSS value with less than 5% traffic loss.

8. The system of claim 1, wherein the set of MSS values comprises at least five MSS values that represent a broad range of Internet traffic.

9. The system of claim 8, wherein the instructions further causes the one or more processors to analyze network element response to the continuous streams of bidirectional and stateful TCP traffic for each of the MSS values of the set of MSS values.

10. The system of claim 1, wherein the predetermined time period comprises a sustain time period, wherein the generated continuous streams of bidirectional and stateful TCP traffic is transmitted at the objective rate for a single MSS value from the set of MSS values; for at least a duration of the sustain time period.

11. The system of claim 1, wherein the initial objective rate is 1 gigabit per second.

12. A method, comprising:
receiving, at an input module, configuration information for performance testing of a network element,
wherein the configuration information comprises at least an initial objective rate, a set of maximum segment size (MSS) values, and a predetermined time period for performance testing, wherein the initial objective rate is a fastest speed for a port on the network element;
transmitting, by an output module, traffic generation information based on the configuration information to a traffic generator to generate continuous streams of bidirectional and stateful Transmission Control Protocol (TCP) traffic to the network element;
analyzing, at a processor module, network element response to the continuous streams of bidirectional and stateful TCP traffic, wherein the analyzing further comprises:
determining the amount of traffic loss by measuring throughput levels at the network element;
verifying that the continuous streams of bidirectional and stateful TCP traffic are symmetrical, wherein the continuous streams of bidirectional and stateful TCP traffic are symmetrical when a rate of traffic throughput transmitted from the network element and a rate of traffic throughput received at the network element are within a predetermined percentage of each other;
outputting, by the output module, results of performance testing based on the analysis of network element response;
determining, by the processing module, whether the performance testing should continue by evaluating status of at least one of the network element response, the predetermined time period for performance testing, and the iteration of MSS value, of the set of MSS values, used for the performance testing;
upon continuing the performance testing, transmitting, by the output module, a new set of traffic generation information to the traffic generator based on updated configuration information using at least one of an adjusted objective rate and the next iteration of MSS value, of the set of MSS values.

13. The method of claim 12,
wherein the continuous streams of bidirectional and stateful TCP traffic are symmetrical when a rate of traffic throughput transmitted from the network element and a rate of traffic throughput received at the network element are within 5% of each other.

14. The method of claim 13, further comprising:
transmitting, in the event verifying that the continuous streams of bidirectional and stateful TCP traffic are symmetrical fails, a new set of traffic generation information using an adjusted objective rate to a traffic generator to generate new continuous streams of bidirectional and stateful TCP traffic to the network element;
determining amount of traffic loss by measuring throughput levels at the network element; and
repeating the actions of transmitting and determining for at least ten iterations until a rate is determined for each MSS value, of the set of MSS values, at which the network element transmits at the MSS value with less than 5% traffic loss.

15. The method of claim 14, wherein the adjusted objective rate is expressed as:(previous objective value−((previous objective value−highest passing objective value)/2)).

16. The method of claim 13, further comprising:
transmitting, in the event verifying that the continuous streams of bidirectional and stateful TCP traffic are symmetrical passes, a new set of traffic generation information using an adjusted objective rate to a traffic generator to generate new continuous streams of bidirectional and stateful TCP traffic to the network element;
determining amount of traffic loss by measuring throughput levels at the network element; and
repeating the actions of transmitting and determining for at least ten iterations until a rate is determined for each MSS value, of the set of M SS values, at which the network element transmits at the MSS value with less than 5% traffic loss.

17. The method of claim 16, wherein the adjusted objective rate is expressed as:(((lowest failing objective value−previous objective value)/2)+previous objective value).

18. The method of claim 12, wherein the set of MSS values comprises at least five MSS values that represent a broad range of Internet traffic.

19. The method of claim 18, wherein analyzing network element response to the continuous streams of bidirectional and stateful TCP traffic for each of the MSS values of the set of MSS values.

20. The method of claim 12, wherein the predetermined time period comprises a sustain time period, wherein the generated continuous streams of bidirectional and stateful TCP traffic is transmitted at the objective rate for a single MSS value from the set of MSS values for at least a duration of the sustain time period.

21. A non-transitory computer readable medium comprising code which when executed by a computer causes the computer to perform the method of claim 12.

* * * * *